US012762727B2

(12) United States Patent
Rudi

(10) Patent No.: US 12,762,727 B2
(45) Date of Patent: Oct. 13, 2026

(54) SYSTEMS AND METHODS FOR POSTURE POSITION DETECTION AND USER FEEDBACK

(71) Applicant: Sony Interactive Entertainment Inc., Tokyo (JP)

(72) Inventor: Olga Rudi, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 280 days.

(21) Appl. No.: 18/490,186

(22) Filed: Oct. 19, 2023

(65) Prior Publication Data

US 2025/0131582 A1 Apr. 24, 2025

(51) Int. Cl.

| | |
|---|---|
| ***G06V 40/20*** | (2022.01) |
| ***A63F 13/45*** | (2014.01) |
| ***G06F 3/01*** | (2006.01) |
| ***G06T 7/70*** | (2017.01) |

(52) U.S. Cl.

CPC ................ *G06T 7/70* (2017.01); *A63F 13/45* (2014.09); *G06F 3/012* (2013.01); *G06V 40/20* (2022.01)

(58) Field of Classification Search

CPC .................................................... G05T 19/003

See application file for complete search history.

(56) References Cited

U.S. PATENT DOCUMENTS

| | | | | |
|---|---|---|---|---|
| 11,544,865 | B1 | 1/2023 | Kurz | |
| 2003/0017872 | A1 | 1/2003 | Oishi et al. | |
| 2021/0099826 | A1* | 4/2021 | Hassager | H04R 5/033 |
| 2022/0319676 | A1* | 10/2022 | Bosanac | G06N 3/0464 |

(Continued)

FOREIGN PATENT DOCUMENTS

| | | | | |
|---|---|---|---|---|
| CN | 114973423 A | * | 8/2022 | G06V 40/20 |
| CN | 116075767 A | * | 5/2023 | H01L 25/0657 |
| CN | 116453384 A | * | 7/2023 | G09B 5/067 |
| CN | 116744043 A | * | 9/2023 | H04N 21/4222 |
| KR | 20200034045 A | * | 3/2020 | A63B 71/0622 |

OTHER PUBLICATIONS

"International Search Report and Written Opinion", issued by the European Patent Office, as International Searching Authority for PCT Application No. PCT/IB2024/060160 on Feb. 6, 2025, 11 pages.

PCT/IB2024/060160, "International Preliminary Report on Patentability", Apr. 30, 2026, 9 pages.

*Primary Examiner* — Di Xiao

(74) *Attorney, Agent, or Firm* — Kilpatrick Townsend & Stockton LLP

(57) ABSTRACT

System, process, and device configurations are provided for posture position detection and user feedback. A method can include capturing posture position data for the user using at least one imaging device, detecting a change in posture position, and controlling output of a posture position notification to the user in response to the change in posture position. Embodiments can include use of an imaging device on at least one of a display, gaming console, and head mounted gaming unit to capture posture position data. Capturing posture position data can include capturing image data of a reflection of the user for at least one of head position, shoulder position and hand position. Output of posture notifications can include controlling display of a message including a notice to correct user posture, or controlling operation of an electronic game for at least one of slowing game play and restricting game play operation.

19 Claims, 5 Drawing Sheets

(56) References Cited

U.S. PATENT DOCUMENTS

| | | | | |
|---|---|---|---|---|
| 2023/0119594 | A1* | 4/2023 | Hernicot | A61B 5/6891 600/587 |
| 2023/0201719 | A1 | 6/2023 | Sheldon et al. | |
| 2023/0226431 | A1* | 7/2023 | Kim | A63B 71/06 482/93 |
| 2025/0110677 | A1* | 4/2025 | Doken | G06T 7/20 |

* cited by examiner

SYSTEMS AND METHODS FOR POSTURE POSITION DETECTION AND USER FEEDBACK

FIELD

The present disclosure is directed to systems and methods for providing user position information including detecting posture position, providing feedback to a user of an interactive entertainment device, and interactive entertainment control, including electronic game control, user interface operations, gaming device operations, and gaming device processes.

BACKGROUND

Users of electronic devices and systems can engage with display screens, control units and devices in a variety of ways. In many cases, users may engage with devices while seated. In addition, users may engage with devices and display screens for prolonged periods of time. Sitting with poor posture for extended periods of time may have negative effects on users. By way of example, sitting with poor posture can lead to back pain, rounded shoulders and other possible complications. Accordingly, there is a desire to provide feedback to users of electronic devices when users have poor posture. One difficulty of posture feedback arises from determining positions for users of different body sizes or body proportions. In addition, many existing interactive electronic devices do not include elements to assess a user. There exists a need for systems and methods for determining user position and providing feedback to users.

BRIEF SUMMARY OF THE EMBODIMENTS

Disclosed and described herein are systems, methods and device configurations for posture position detection and user feedback. In one embodiment, a method includes detecting, by a device, a baseline posture reference for a user, and capturing, by the device, posture position data for the user, wherein the posture position data is detected by at least one imaging device. The method also includes detecting, by the device, a change in posture position relative to the baseline posture reference using the posture position data. The method also includes controlling, by the device, output of a posture position notification to the user in response to the change in posture position.

In one embodiment, the baseline posture reference includes reference image data of the user.

In one embodiment, the baseline posture reference includes a position reference for at least one of a gaming headset and gaming controller.

In one embodiment, detecting the baseline posture reference includes outputting an instruction for the user to stand and capturing image data of the user in a standing position.

In one embodiment, the baseline posture reference includes identification of at least one first point of the user, identification of at least one second point on the user and a distance from the at least one first point to the at least one second point.

In one embodiment, capturing posture position data for the user includes controlling an imaging device on at least one of a display, gaming console, and head mounted gaming unit to capture posture position data for the user including capturing image data for at least one of head position of the user, shoulder position of the user and hand position of the user.

In one embodiment, capturing posture position data for the user includes capturing image data of a reflection of the user for at least one of head position of the user, shoulder position of the user and hand position of the user.

In one embodiment, detecting a change in posture position relative to the baseline posture reference includes detecting at least one of forward shoulder lean, shoulder hunch and shoulder lean relative to the baseline position reference.

In one embodiment, output of the posture notification includes controlling display of a message including a notice to correct user posture.

In one embodiment, output of the posture notification includes controlling operation of an electronic game for at least one of slowing game play and restricting game play operation.

Another embodiment is directed to a device configured for posture position detection and user feedback. The device includes at least one imaging device, a memory storing executable instructions and a controller, coupled to the at least one imaging device and memory. The controller is configured to detect a baseline posture reference for a user, and control the at least one imaging device to capture posture position data for the user. The controller is also configured to detect a change in posture position relative to the baseline posture reference using the posture position data. The controller is also configured to control output of a posture position notification to the user in response to the change in posture position.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
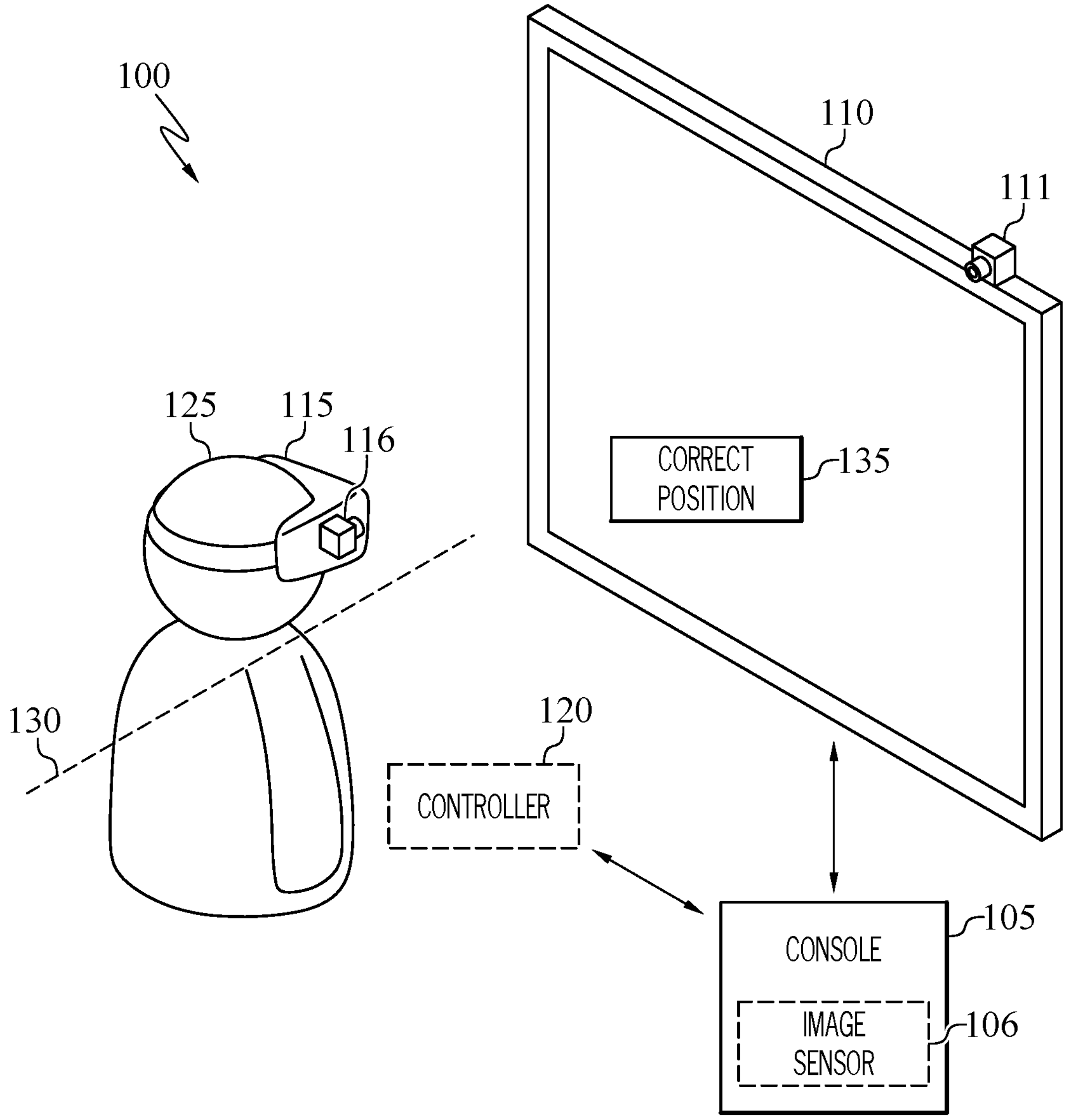
FIG. 1 is a graphical representation of posture position detection and user feedback according to one or more embodiments.

One aspect of the disclosure is directed to detecting user posture position and providing feedback. Embodiments include systems, device configurations and methods for detection of user posture, including but not limited to one or more positions a user holds their body when standing or sitting. Embodiments allow for detecting posture positions during use of a device, such as an interactive entertainment device, media player, gaming console, virtual reality device (e.g., headset, hand controls, etc.) and electronic devices in general. Embodiments provide operations for detection of posture with one or more imaging sensors (e.g., cameras) and for providing feedback to a user by one or more of displayed message, audio output and even control of a device, such as control of one or more functions of an electronic game.

Embodiments may be configured to detect and provide posture feedback to assist users. Even with equipment design accounting for human factors and ergonomics, poor body position can lead to changes in posture and possible health consequences. In addition, poor body position and posture can interfere with device operation. Embodiments provide operations and device configurations that may be incorporated with interactive entertainment devices, media players and game consoles with features that allow for prevention of poor body position. An additional benefit or preventing poor body position and/or maintaining a preferred posture or body position may be to enhance user experience of devices. In addition, providing feedback on posture position may improve device function and provide feedback to users to aid in device operation. Embodiments include operations and device configurations that can include imaging users to detect posture position. According to embodiments, operations and device configurations can include detecting reflections of users and/or detecting reflective surfaces and changes in reflective surface to identify one or more of user posture position and objects relative to a user.

Another aspect of the disclosure is directed to providing feedback control to users of interactive entertainment, including virtual reality systems. Head worn devices, such as head mounted units, virtual reality goggles and immersive experiences may detect user motion and control device operation, such as views of a game or experience. Detection and feedback of posture position can increase the degree of motion for a user and may also improve user comfort. Operations and device configurations can provide solutions for detecting user position and leveraging one or more components of a device to provide control and feedback for presentation of content. By way of example, device configurations for use of an imaging device on a user wearable or a companion device may provide posture position information and data for control of media and/or game output to a user.

Embodiments may also provide feedback in connection with electronic games and directed to gaming systems, such as consoles, processors or servers that generate game media and interactive entertainment devices configured to provide output and receive user input. Users of electronic devices (e.g., players, gamers, etc.) may operate devices for extended periods of time and may need feedback for correction of posture and posture position. Typical gaming systems and gaming platforms may be agnostic to player body position. In addition, existing systems may not account for differences in users. Embodiments provide valuable feedback and can address drawbacks of existing systems. In addition to providing feedback to a user, such as a notification to correct posture, embodiments can control game operation to incentivize user behavior and user posture position. Embodiments include systems and methods for providing user position information including detecting posture position, providing feedback to a user of an interactive entertainment device and interactive entertainment control, including electronic game control, user interface operations, gaming device operations, and gaming device processes.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

EXEMPLARY EMBODIMENTS

FIG. 1 is a graphical representation of posture position detection and user feedback according to one or more embodiments. FIG. 1 illustrates an exemplary system 100 including console 105 and display 110. System 100 may optionally include a device 115 including imaging sensor 116 (e.g., camera). System 100 optionally includes controller 120 configured to provide user input to console 105. According to embodiments, system 100 and one or more of device 105 and device 115 may be configured to detect posture position of user 125 and provide user feedback. According to embodiments, system 100 may include at least one imaging device, such as image sensor 106 of console 105, image sensor 111 associated with display 110 and image sensor 116 associated with device 115. These image sensors may be cameras or other optical devices, configured to detect and track user 125 and posture position of user 125. Embodiments provide multiple methods and device configurations for detection of posture position.

According to embodiments, one or more devices of system 100 may be configured to detect user posture position. According to embodiments, posture position may be detected relative to operation of a device. By way of example, image sensor 106 of console 105 may detect user posture position during use of console 105. By way of another example, imaging device 111 of display 110 may detect posture position when a user is viewing content displayed by display 110. Similarly, imaging device 116 of display 110 may detect posture position when a user is using device 115. According to embodiments, system 100 may perform one or more operations and processes for detecting user posture position. Devices of system 100 may include controllers or processors configured to control at least one imaging device to capture posture position data for the user. According to another embodiment, each of devices 105, 110, and 115 may use and receive image data from one or more imaging devices 106, 111 and 116. Console 105 may be configured to control one or more of image sensor 106, imaging device 111 and imaging sensor 116 to capture image data of user 125. Console 105 may detect a change in posture position relative to the baseline posture reference 130 using the posture position data. According to embodiments, console 105 may control output of a posture position notification, such as displayed messaged 135, to the user in response to the change in posture position. According to embodiments, displayed message may relate to one or more game elements of an electronic game, including but not limited to graphical elements of a game, characters of a game and messages in general for the game. According to embodiments, console 105 may be configured to control a non-player character (NPC) or game character to provide at least one of audio and graphical output for a posture position notification. Device 115 may similarly be configured to output posture position notifications. Posture position notifications may also be provided by controlling one or more device operations. According to embodiments, display 110 and/or device 115 may be configured to similarly control one or more of image sensor 106, imaging device 111 and imaging sensor 116 to capture image data of user 125.

Figure 2:
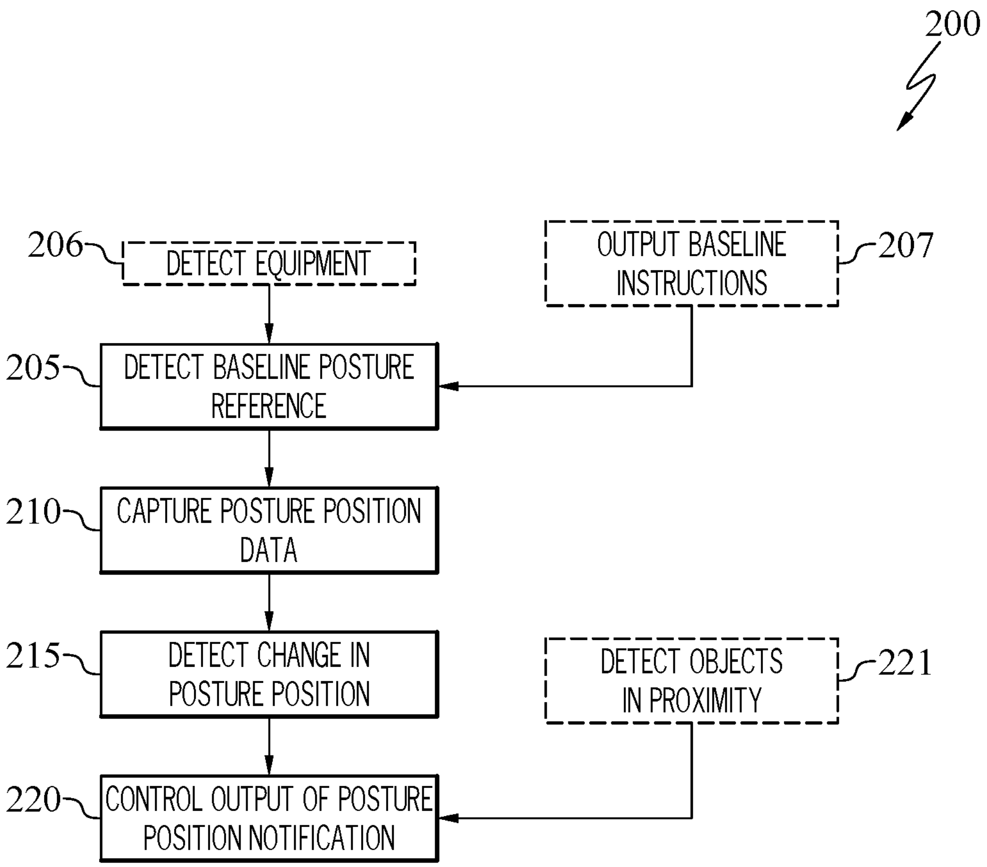
FIG. 2 illustrates a process for posture position detection and user feedback according to one or more embodiments.

One or more devices of system 100 may perform operations of process 200 of FIG. 2. Detection of a posture change may include determining a baseline posture reference 130 for user 125. Baseline posture reference 130 may relate to one or more of a shoulder position, body position, head angle, and distances determined for one or more reference points. According to embodiments, baseline posture position reference 130 may include a reflection detected of user 125. A device may be configured to detect a baseline posture reference 130 for user 125 and control output of a notification, such as displaying message 135 and/or controlling operation of a device.

According to embodiments, posture position determinations may be determined using a reference, such as baseline posture reference 130. Posture as described herein may relate to a position a person holds their body. Posture positions can include a seated posture and standing posture. Baseline posture references may be determined for one or more posture positions. According to embodiments, a baseline posture reference may be determined based on one or more instructions provided to a user. By way of example, in some embodiments system 100 may instruct user 125 to stand in order to determine baseline posture reference 130. A standing posture may be used as a baseline reference for standing and seated positions. Similarly, system 100 may instruct user 125 to sit up straight in order to determine baseline posture reference 130 for a seated position. A baseline posture reference can be detected in response to outputting the instruction for the user to stand and capturing image data of the user in a standing position. Additional commands may be provided to a user by way of displayed commands, audible instructions and device output to instruct a user in positioning for determining a baseline posture reference. Baseline posture references may be determined for multiple positions of a user and for one or more views of a user, including a frontal view, side profile view and reflection of the user.

According to embodiments, baseline posture references may be determined using image data of a user. Image data from one or more of image sensor 106, imaging device 111 and imaging sensor 116 may capture baseline posture reference 130 for image data of user 125. A baseline posture reference can include reference image data of a user. Changes in image data of a user can indicate a change in user position or posture. According to embodiments, baseline reference may include one or more distance and body ratio determinations relative to features of a user. Accordingly, posture position for a user closer in frame or further in frame may still be determined using one or more distance and body determinations. For example, a baseline posture reference can include identification of at least one first point of the user, identification of at least one second point on the user and a distance from the at least one first point to the at least one second point. For example a first point may relate to a shoulder region of a user and a second point may relate to one or more of a chin, eye, forehead, jawline, etc. In addition to imaging of a user, baseline posture references can include a position reference for at least one of a gaming headset, such as device 115, and gaming controller, such as optional controller 120. Physical features of a user may be difficult to assess when a user is wearing a gaming headset or head mounted unit due to the device blocking features of a user. Accordingly, a reference position of the user headset relative to a user controller may provide references and/or parameters for assessing user posture position. Posture can include one or more positions a user holds their body and positions for holding control elements. For example, a user holding a game controller a distance from a gaming headset or head mounted unit may also provide a position reference. Using image data captured for one or more positions allows for detecting a user out of range or out of position when a game controller moves beyond a distance threshold or within a proximity to a head mounted unit. In addition to distance, the baseline position reference may include one or more time periods. For example, a user moving a game controller near a headset for a short period of time, such as 1-2 seconds, may be a reasonable duration and also an occurrence that occurs with at least some regularity during device operation. However, when a controller appears to be fixed in front of a user face or headset for a period of time, such as 10 seconds or more, the user may be in an unwanted position. Accordingly, a position changing exceeding a threshold or diverging from one or more baseline posture references may be a basis for generating a posture position notification.

One or more control operations may be performed based on detected user posture position. By controlling output of a posture position notification, users may be able to correct their posture. In addition, by controlling operation of a device, including output of media such as an electronic game, may be performed until a posture position is detected. By way of example, to encourage use of a device with good posture, output of game functions may be slowed and/or user ability to control game functions may be slowed or delayed until a user has good posture. Good or proper posture may have one or more characteristics, such as sitting tall with shoulders back. Similarly, some users may have limits on their ability to have good posture while sitting or standing. Embodiments can address user characteristics and limitations with detection of a baseline posture position reference 135. Detection of posture may include detecting the position or arrangement of one or more devices worn or held by user 125, including device 115 and optional controller 120.

According to embodiments, detecting posture position may be performed to control or modify operation of a device for output of gaming content and device configuration. By way of example, device 115 may be a head mounted unit or virtual reality unit detecting the arrangement or movements of a user. As such, posture changes detected by device 115 may lead to changes in input and/or the arrangement of device 115. Maintaining a posture position may enhance the operation of device 115 by minimizing and/or eliminating the effect of posture change on motion input for controlling a view and/or operation of one or more of augmented reality, electronic gaming and media output.

According to embodiments, one or more imaging sensors and imaging devices, such as devices 106, 111 and 116 may be independent from devices of system 100, such that a device of system 100 can receive image data from another device. Accordingly, system 100 and one or more devices of system 100 may receive image data of a user from image sensors in proximity, such as image sensors or cameras on the same network (e.g., WiFi, wireless cameras, etc.). Console 105 may be a gaming console or interactive entertainment device configured to output gaming content and/or media to display 110. Console 105 may receive input from optional controller 120. Devices of system 100 may interoperate with one another. For example, console 105 may be configured to provide gaming content for display on display 110 and/or for device 115 which may include an integrated display. Similarly, optional controller 120 may operate to provide user input commands to one or more of console 105, display 110 and device 115. Embodiments may apply to several use cases such as gaming, use of virtual or augmented reality, media viewing, etc.

According to embodiments, system 100 may be configured for one or more users. While FIG. 1 is illustrated showing user 125, it should be appreciate that embodiments may be applied to multiple users. Operations and processes may be performed on a user in one or more positions, included seated, standing, lounging, etc.

According to embodiments, system 100 may be configured to present electronic gaming content from one or more of a gaming console, such as console 105, or from a network source to one or more devices of system 100. Content presented on a display 110, such as game content, may have one or more game objects or elements. The game objects may move position in response to user controls and control notifications may include controlling one or more of display and control features of the gaming content.

According to embodiments, system 100 and configurations described herein may be configured to provide features to improve user experience, wherein functions and operations described herein are performed following user consent with express notice to a user and/or in alignment with one or more user settings and preferences for user privacy. It should be appreciated that embodiments may be applied to interactive entertainment with one or more users. Processes described herein are not limited to gaming content.

FIG. 2 illustrates a process for posture position detection and user feedback according to one or more embodiments. Process 200 may detect changes in posture position for one or more users. According to embodiments, process 200 may detect user posture position based on image data captured for a user. Image data may be captured to determine a baseline or reference. Image data may be captured during use of a device and used to determine changes in posture position. Process 200 may include controlling output of notifications, determining baseline posture references and detecting changes in posture positions.

Figure 3:
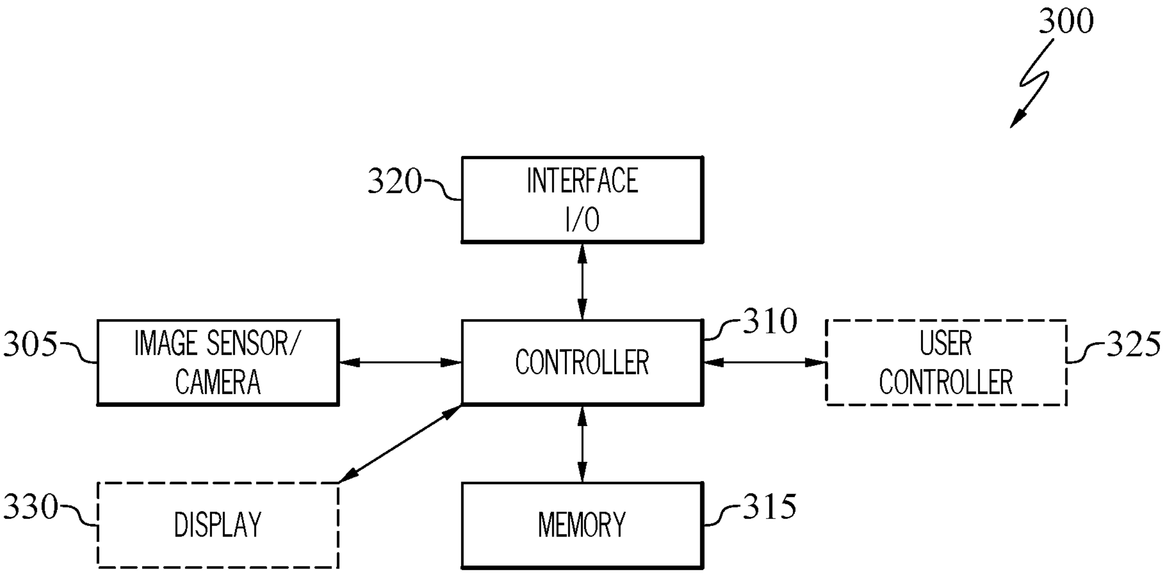
FIG. 3 illustrates a graphical representation of a device configuration according to one or more embodiments.

Process 200 may be performed by a device, such as device 300 and/or controller 310 of FIG. 3, for operations. Process 200 may be initiated by a device (e.g., device 300) detecting a baseline posture reference at block 205. According to embodiments, a baseline posture reference may include one or more parameters to assess posture position of a user. According to embodiments, a baseline posture reference determined at block 205 may include capturing image data of a user and determining at least one reference image of the user. One or more images may be captured of a user by an imaging device. Process 200 may use image data from one or more devices, including image data captured by a head mounted device, image data captured by a display, and image data captured by a console device. Image data of the user detected for a baseline posture reference may be image data captured at the start of a gaming session or during one or more periods of a gaming session.

According to embodiments, image data of a user may be detected from one or more perspectives. By way of example, image data of a user may be image data captured of a user's front profile. The image data may be captured by a device, such as an imaging device of a console (e.g. console 105) or a display device (e.g., display device 110). According to embodiments, image data may be captured from an image sensor of a virtual display unit (e.g., device 115) worn by a user may include image data of a surrounding area. The position of a user may be determined from one or more reflections in the area. By way of example, users in front of a display device (e.g., television, computer monitor, etc.) may have a reflection on the display screen and one or more other reflective surfaces.

According to embodiments, detection of the baseline posture reference includes a position reference for at least one of a gaming headset and gaming controller. Image data detected of a user may capture the position of headset and gaming controller relative to one another, and include one or more distance estimates characterizing the position of the element as position references. With an imaging device capturing the element, image data showing the gaming controller move closer or farther from the gaming headset may indicate a change in user posture, such as rounding of a user's. Baseline references based on position of a gaming headset and controller may include size estimates and/or distance estimates based on the number of pixels of image data associated with the element.

According to embodiments, detection of the baseline posture reference includes determining position references for one or more portions of a user's body relative to an image sensor. A baseline posture reference can include identification of one or more portions of a user and user body. The baseline posture reference can include identification of at least one first point of the user, identification of at least one second point on the user and a distance from the at least one first point to the at least one second point. Using shoulders of a user for example, the baseline posture reference can include an estimated distance separating a the first shoulder to the second shoulder, a shoulder to a user's chin, user chin to user's chest, distances to facial features, etc.

Process 200 may include detecting equipment at optional block 206. For example, user position may be based on the imaging device available, image device position, and type of activity a user is performing. At block 206 process 200 may identify the imaging device to capture images of a user, commands needed to obtain a baseline posture position reference and devices controlled by a user (e.g., headset, game controllers, etc.). Process 200 may also optionally output baseline instructions at block 207. According to embodiments, baseline instructions may be output to a user to instruct the user in sitting or standing with a good posture. A user profile may provide user preferences of gaming devices used and stored reference data for a user.

Process 200 may include outputting instructions for baseline position optional block 207. By way of example, instructions may be output on a display and/or output as audio to include instructions to the user to sit or stand with a good posture. According to embodiments, a baseline posture reference may be determined by outputting an instruction for the user to stand and capturing image data of the user in a standing position. A standing position may present a user with a more desirable posture in that standing the user may be more likely to exhibit a more ergonomic position. The user may be instructed to turn or face a camera to obtain additional image data as references. Instructions may include commands that are easy for a user to understand, such as sit tall with shoulders back. Image data may be captured of the user in response to the baseline instructions, and the image data may be stored as a reference to assess user posture position. Baseline posture references may be determined for a plurality of imaging devices. According to embodiments, baseline posture reference may be determined by instructing a user to perform a sequence of movements, such as proper position sequence. The position sequence may include detection positions hands of a user are comfortable.

At block 210, process 200 includes capturing posture position data for at least one user. Once a baseline posture reference is determined at block 205, posture position of the user may be tracked. According to embodiments, video and/or still image data may be detected of the user. When image data is capture by an imaging device, the image data may be provided to a controller. Capturing posture position data at block 210 may include capturing image data from one or more devices. Capturing posture position data for the user includes controlling an imaging device on at least one of a display, gaming console, and head mounted gaming unit to capture posture position data for a user. The captured posture position data may include capturing image data for at least one of head position of the user, shoulder position of the user and hand position of the user. Capturing posture position data for the user can include capturing image data of a reflection of the user for at least one of head position of the user, shoulder position of the user and hand position of the user.

At block 215, process 200 includes detecting a change in posture position relative to the baseline posture reference using the posture position data. According to embodiments, one or more operations may be performed to determine and detect changes in posture position from captured posture position data. Detecting a change in posture position may be relative to the baseline posture reference and include detecting at least one of forward shoulder lean, shoulder hunch and shoulder lean relative to the baseline position reference. Changes in posture position may be detected in response to user movement, such as slouching rounding back, shoulder tilt, etc. A change in posture position may be detected when the position is held for a predetermined period of time, such as greater than 10 seconds for example. According to other embodiments, the change in posture position may be detected when posture diverges from a baseline reference for an accumulated period of time, such as more than 15 minutes over the past 30 minute time period.

At block 220, process 200 includes controlling output of a posture position notification to the user in response to the change in posture position. Output of the posture position notification may include one or more visual notifications, such as output of the posture notification includes controlling display of a message including a notice to correct user posture. When a console device is connected to a display, the posture position notification may be presented on the display for a period of time and/or until a corrected posture is detected. With head mounted devices, the display notification may be presented on a display of the head mounted unit. The posture position notification can include one or more audio outputs including alarm sounds, recorded voice and instructions to correct posture. According to embodiments, output of a posture notification at block 220 may include control of one or more haptic elements in game controllers or wearables. According to embodiments, for electronic gaming the posture notification can include controlling operation of an electronic game for at least one of slowing game play and restricting game play operation. For example, in a racing game a vehicle may have reduced or diminished control, speed, turning ability and control in general. For games in general, the notification may be presented in limiting or reducing one or more game functions. For games with non-player characters (NPCs), one or more NPCs may be configured to generate output such as text of audio data to provide a posture notification. Notifications may include one or more electronic communications transmitted (e.g., email, user interface, etc.) transmitted based on account settings of a user to notify the user and/or one or more adults associated with a gaming account.

According to embodiments, output of a posture notification at block 220 may include controlling one or more game elements of an electronic game, including but not limited to graphical elements of a game, characters of a game and messages in general for the game. According to embodiments, controlling output of a posture position notification may include a device controlling a non-player character (NPC) or game character to provide at least one of audio and graphical output for a posture position notification. By way of example, output may include a message from an NPC including a notification of posture position and/or a direction. An example communication from a NPC in an electronic game may be an NPC outputting an audio and/or text command (e.g., "straighten up") when a bad posture is detected. Another output may include controlling a game to generate a game task to change a user's position. By way of example, if a user's body is in an odd position, controlling output of the posture notification can include generating a command to initiate the user to reposition their body. In a virtual reality game for example, a posture position notification can include the command to pick up an item in order to initiate a user to move at least one of their arms, bend down, and/or twist as part of a game task (e.g., picking up a game element or game weapon from the ground).

According to embodiments, process 200 may optionally include detecting objects in close proximity to a user at block 221. With a head mounted display, user vision and awareness of objects in close proximity may be hard to detect. A user may step on a moving object such as a pet or stumble on a nearby object when wearing a headset. Embodiments include detecting one or more objects in proximity to a user. Based on captured position data, when a user is in close proximity to an object, such as a tripping hazard on the floor, notifications at block 220 may include one or more of a visual, audio, text and light display to inform the user of the object.

Process 200 describes operations with respect to electronic gaming. It should be appreciated that principles of the disclosure may be applied to use of electronic devices in general and is not limited to electronic gaming.

FIG. 3 illustrates a graphical representation of a device configuration according to one or more embodiments. Device 300 is configured for posture position detection and user feedback and may relate to a gaming console, head mounted unit, media device, and/or handheld device. Device 300 may be configured to present and update gaming content using one or more player posture positions. According to embodiments, device 300 includes image sensor/camera 305, controller 310, and memory 315. Device 300 may also include an interface (e.g., network communication module, input/output (I/O) interface) 320. Device 300 may receive input from a game controller 325 and output content to display 330, which may be optional. Device 300 may output gaming content to display 330.

Controller 310 may relate to a processor or control device configured to execute one or more operations (e.g., executable instructions) stored in memory 315, such as processes for posture position detection and user feedback. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit network communication data, image data from one or more imaging devices and gaming content. Device 300 may be configured to receive gaming media (e.g., card, cartridge, disk, etc.) and output visual and audio content of the gaming media to a display. For network games, device 300 may receive game data from a network source. Device 300 may be configured to receive input from one or more peripheral devices, such as sensor image 305 and optional user controller 325.

Controller 300 may be configured to control presentation of gaming content, and detect a change in posture position relative to the baseline posture reference. Controller may be configured to detect a baseline posture reference for a user, and control the at least one imaging device to capture posture position data for the user. Controller 300 may also be configured to control output of a posture position notification to the user in response to the change in posture position.

Figure 4:
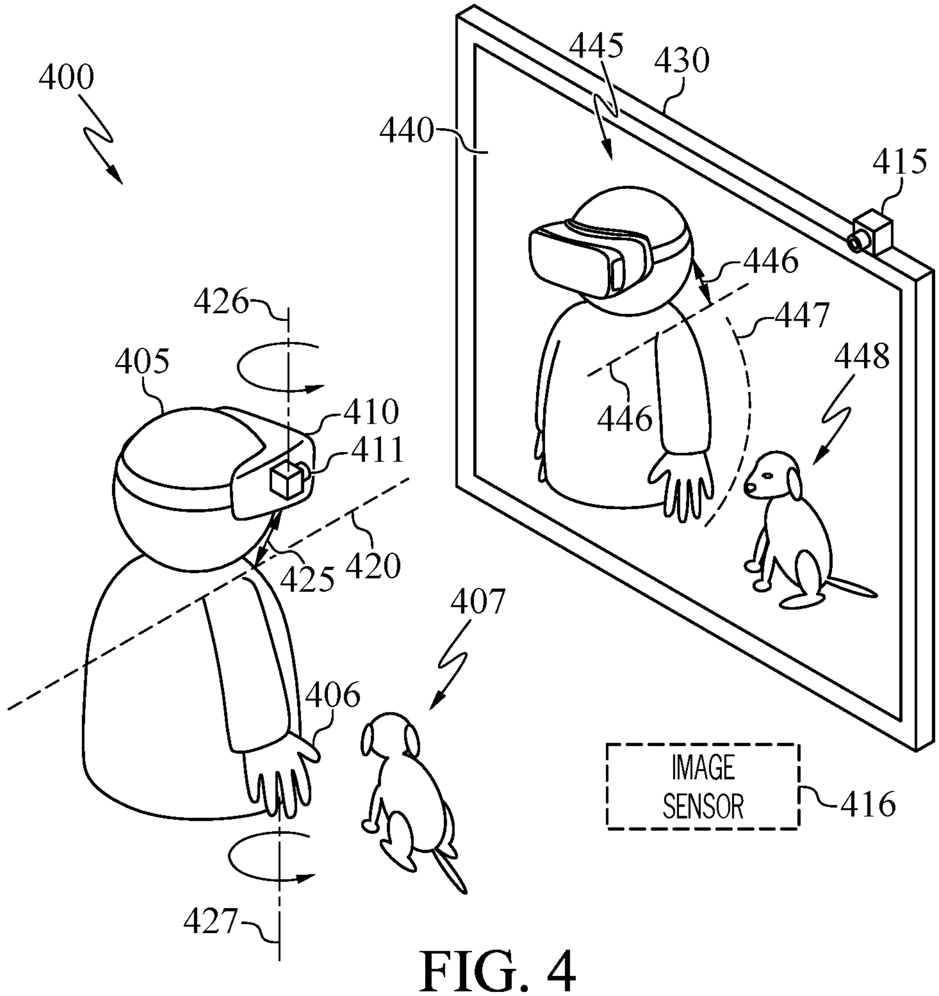
FIG. 4 illustrates a graphical representation of posture position detection and user feedback according to one or more embodiments.

FIG. 4 illustrates a graphical representation of posture position detection and user feedback according to one or more embodiments. Embodiments described herein include image detection to determine and/or correction posture position. Processes and configurations provided herein may be configured to capture image data of a user to provide feedback of objects in close proximity to a user. In addition, embodiments may be configured to detect posture position from reflections of a user. FIG. 4 illustrates system 400 which may include one or more device to capture user image data and output one or more notifications.

User 405 is shown in FIG. 4 including body part (e.g., hand, knee, etc.) 406. FIG. 4 also shows an object, pet 407 in close proximity to user 405. According to embodiments, one or more of devices 410, 415 and 416 may capture image data of a user and/or reflection of a user and one or more objects in the vicinity of a the user. Device 410 may relate to a head mounted display including imaging device 411. Image sensor 415 may be associated with a display device 430. Image sensor 416 is optional and may be an image sensor of a game console, or a camera associated with a network within the area of user 405.

FIG. 4 illustrates baseline posture reference 420 of user 405. Baseline posture reference 420 includes identification of at least one first point of the user, such as the user shoulder. The baseline position reference can also include identification of at least one second point on the user, such as the position of body part 406 or the position of a user face associated with device 410. The baseline position reference can also provide a distance from the at least one first point to the at least one second point, such as distance 425, from baseline position reference 420 to device 410. According to embodiments, inertial measurement data from one or more inertial measurement units (IMUS) in device 410 and a game controller may provide orientation and/or angular data 426 and 427 associated with device 410 an body part 406, respectively.

According to embodiments, one or more imaging devices of system 400 may detect a reflection of user 405 and/or one or more body parts of the user. FIG. 4 illustrates display 430 including reflective surface 440 and reflection 445. According to embodiments, imaging senor 411 may capture image data for reflection 445 and measure distances of elements in reflection 445, such as distance 446 from a body part to a baseline reference. According to embodiments, notifications may be generated for any objects determined to be within a predefined distance, shown as range 447 from user 405. When a reflective element approaches or passes into range 447, such as reflection 448 of pet 407 approaches or enters in range 447, a notification may be generated of user 405. User notifications can include one o more of visual, audio and haptic feedback.

According to embodiments, reflections of objects on reflective surface 440 may be captured for determining posture position data for user 405. One or more imaging devices of system 400 may capture posture position data for user 405 including controlling an imaging device on at least one of a display, gaming console, and head mounted gaming unit to capture posture position data for the user includes capturing image data for at least one of head position of the user, shoulder position of the user and hand position of the user. Capturing posture position data for user 405 may include capturing image data of a reflection of the user for at least one of head position of the user, shoulder position of the user and hand position of the user.

Figure 5:
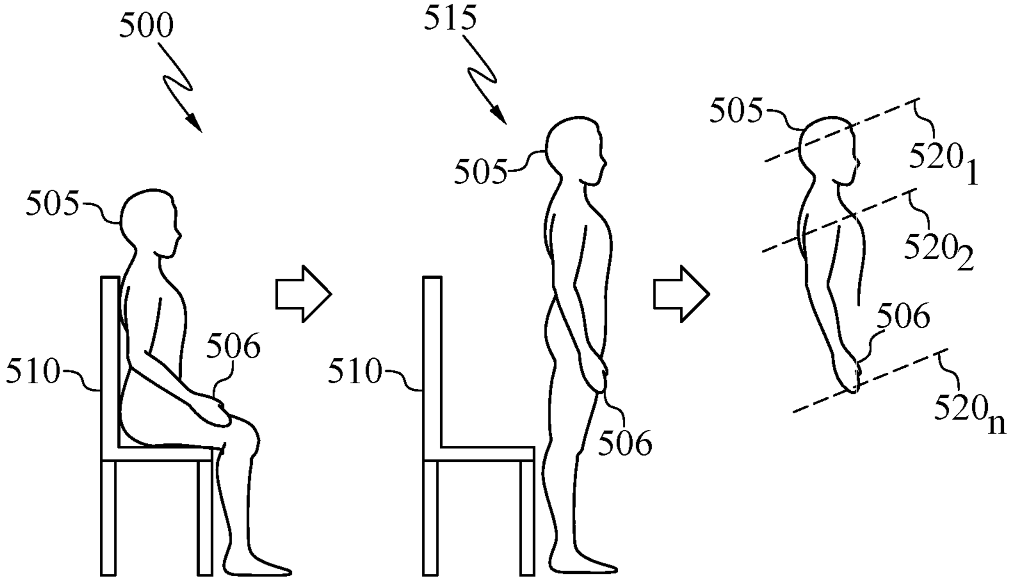
FIG. 5 illustrates a graphical representation of determining a baseline posture reference according to one or more embodiments.

FIG. 5 illustrates a graphical representation of determining a baseline posture reference according to one or more embodiments. According to embodiments, process 500 may determine a baseline posture position for user 505 by providing baseline instructions. Process 500 is shown for user 505 in a seated position in chair 510. According to embodiments, a baseline posture position may be determined for user 505 in seated position by instructing the user to sit with good posture, such as sitting tall with shoulders back and looking forward to an imaging device. In a seated position the baseline instructions may also indicate placement of user hand 506. The baseline posture position may capture images of the user and determine one or more reference points. According to embodiments, baseline instructions may include instructions for user to be in a standing position 515. A standing position may be used for a baseline posture position reference determination as users may exhibit better or improved posture while standing.

Process 500 shows user 505 with a plurality of baseline posture position references $\mathbf{520}_{1\text{-}n}$. According to embodiments, baseline posture position references $\mathbf{520}_{1\text{-}n}$ include a reference point $\mathbf{510}_1$ for a head of user 505, reference point $\mathbf{510}_2$ for a shoulder(s) of user 505, and reference point $\mathbf{510}_n$ for a hand(s) of user 505.

Figure 6:
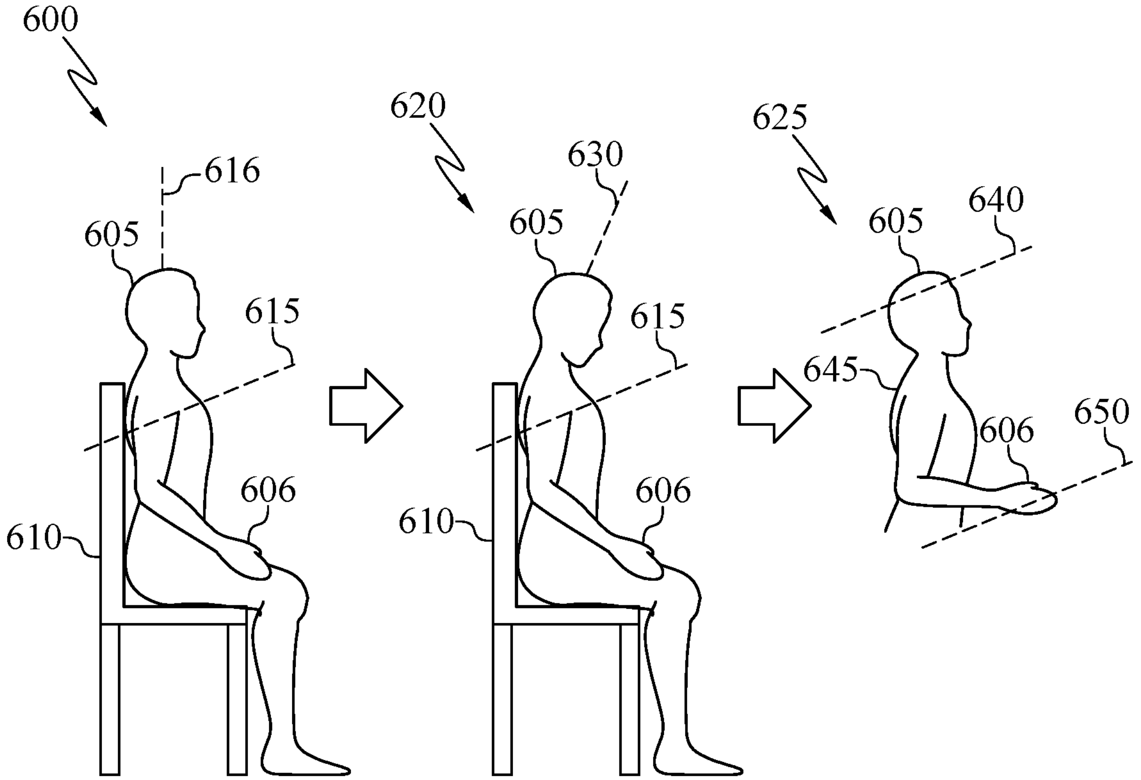
FIG. 6 illustrates a graphical representation of posture position detection according to one or more embodiments.

FIG. 6 illustrates a graphical representation of posture position detection according to one or more embodiments. According to embodiments, process 600 may detect changes in posture position for user 605. Process 600 is shown for user 605 in a seated position in chair 610. According to embodiments, a baseline posture position may be determined for user 605 in seated position including references 615 and 616 for user 605. Reference 615 may relate to a body part reference, such as the position of a shoulder of user 605. The baseline posture position reference of a user may be a non-hunching position. Reference 616 may relate to a body part reference, such as the user head position of user 605. According to embodiments, detecting a change in position may include position 620 and/or position 625 having poor or non-ergonomic posture position. Position 620 provides an example of a slouched position detected based on a change in the baseline reference for user's head, wherein one or more of head tilt, shoulder roll and rounded back may be detected. Position 620 illustrates the baseline reference 630 having a reduced distance to baseline reference 615. Position 625 provides another example of a slouched position detected based on a change in the baseline reference for user hand 606, and rounded or slouched back 645 of user 605. Position reference 640 may be indicative users posture and hand position may be indicated by reference 650. Based on changes in position from a baseline reference determined for a sitting position for user 605, a position notification may be generated. Posture positions and terminology for the condition of poor posture in FIG. 6 are exemplary. Embodiments may apply to other posture situations.

While this disclosure has been particularly shown and described with references to exemplary embodiments thereof, it will be understood by those skilled in the art that various changes in form and details may be made therein without departing from the scope of the claimed embodiments.

What is claimed is:

1. A computer-implemented method, comprising:

detecting, by a device, a baseline posture reference for a user;

receiving, by the device, posture position data for the user, wherein the posture position data is detected by at least one imaging device;

detecting, by the device, based at least in part on the posture position data, that one or more posture positions of the user deviates from the baseline posture reference for a first predetermined period of time, wherein detecting that the one or more posture positions of the user deviates from the baseline posture reference includes detecting that the user maintains a first posture position of the one or more posture positions for a second predetermined period of time; and in response to the one or more posture positions of the user deviating from the baseline posture reference for the first predetermined period of time, controlling, by the device, output of a posture position notification to the user, wherein controlling the output of the posture position notification is in response to detecting that the user maintains the first posture position for the second predetermined period of time.

2. The computer-implemented method of claim 1, wherein the baseline posture reference includes reference image data of the user.

3. The computer-implemented method of claim 1, wherein the baseline posture reference includes a position reference for at least one of a gaming headset and gaming controller.

4. The computer-implemented method of claim 1, wherein detecting that the one or more posture positions of the user deviates from the baseline posture reference includes outputting an instruction for the user to stand and capturing image data of the user in a standing position.

5. The computer-implemented method of claim 1, wherein the baseline posture reference includes identification of at least one first point of the user, and identification of at least one second point on the user and a distance from the at least one first point to the at least one second point.

6. The computer-implemented method of claim 1, wherein capturing posture position data for the user includes capturing image data of a reflection of the user for at least one of head position of the user, shoulder position of the user and hand position of the user.

7. The computer-implemented method of claim 1, wherein detecting that the one or more posture positions of the user deviates from the baseline posture reference includes detecting at least one of forward shoulder lean, shoulder hunch and shoulder lean relative to the baseline position reference.

8. The computer-implemented method of claim 1, wherein output of the posture notification includes at least one of:

displaying a message including a notice to correct user posture;

slowing game play of an electronic game; or restricting game play operation of the electronic game.

9. The computer-implemented method of claim 1, wherein the second predetermined period of time is less than the first predetermined period of time.

10. A computer-implemented method, comprising:

detecting, by a device, a baseline posture reference for a user;

receiving, by the device, posture position data for the user, wherein the posture position data is detected by at least one imaging device;

detecting, by the device, based at least in part on the posture position data, that one or more posture positions of the user deviates from the baseline posture reference for a first predetermined period of time, wherein detecting that the one or more posture positions of the user deviates from the baseline posture reference includes detecting that the user maintains a first posture position of the one or more posture positions for a second predetermined period of time; and in response to the one or more posture positions of the user deviating from the baseline posture reference for the first predetermined period of time, controlling, by the device, output of a posture position notification to the user, wherein controlling the output of the posture position notification is in response to detecting that the user maintains the first posture position for the second predetermined period of time.

11. The device of claim 10, wherein the baseline posture reference includes reference image data of the user.

12. The device of claim 10, wherein the baseline posture reference includes a position reference for at least one of a gaming headset and gaming controller.

13. The device of claim 10, wherein detecting that the one or more posture positions of the user deviates from the baseline posture reference includes outputting an instruction for the user to stand and capturing image data of the user in a standing position.

14. The device of claim 10, wherein the baseline posture reference includes identification of at least one first point of the user, and identification of at least one second point on the user and a distance from the at least one first point to the at least one second point.

15. The device of claim 10, wherein capturing posture position data for the user includes capturing image data of a reflection of the user for at least one of head position of the user, shoulder position of the user and hand position of the user.

16. The device of claim 10, wherein detecting that the one or more posture positions of the user deviates from the baseline posture reference includes detecting at least one of forward shoulder lean, shoulder hunch and shoulder lean relative to the baseline position reference.

17. The device of claim 10, wherein output of the posture notification includes controlling display of a message including a notice to correct user posture.

18. The device of claim 10, wherein output of the posture notification includes controlling operation of an electronic game for at least one of slowing game play and restricting game play operation.

19. One or more non-transitory computer-readable media comprising computer-executable instructions that, when executed by one or more processors of a device, cause the device to perform operations comprising:

detecting, by the device, a baseline posture reference for a user;

receiving, by the device, posture position data for the user, wherein the posture position data is detected by at least one imaging device;

detecting, by the device, based at least in part on the posture position data, that one or more posture positions of the user deviates from the baseline posture reference for a first predetermined period of time, wherein detecting that the one or more posture positions of the user deviates from the baseline posture reference includes detecting that the user maintains a first posture position of the one or more posture positions for a second predetermined period of time; and in response to the one or more posture positions of the user deviating from the baseline posture reference for the first predetermined period of time, controlling, by the device, output of a posture position notification to the user, wherein controlling the output of the posture position notification is in response to detecting that the user maintains the first posture position for the second predetermined period of time.

* * * * *